United States Patent
Thakkar et al.

(10) Patent No.: US 9,223,373 B2
(45) Date of Patent: Dec. 29, 2015

(54) POWER ARBITRATION FOR STORAGE DEVICES

(71) Applicant: STEC, Inc., Santa Ana, CA (US)

(72) Inventors: Umang Thakkar, San Diego, CA (US); Amir Alavi, Irvine, CA (US); Lun Bin Huang, San Diego, CA (US); Dillip K. Dash, San Diego, CA (US)

(73) Assignee: HGST Technologies Santa Ana, Inc., Santa Ana, CA (US)

( * ) Notice: Subject to any disclaimer, the term of this patent is extended or adjusted under 35 U.S.C. 154(b) by 357 days.

(21) Appl. No.: 13/842,101

(22) Filed: Mar. 15, 2013

(65) Prior Publication Data

US 2013/0254562 A1 Sep. 26, 2013

Related U.S. Application Data

(60) Provisional application No. 61/613,916, filed on Mar. 21, 2012.

(51) Int. Cl.
*G06F 1/32* (2006.01)
*G06F 1/26* (2006.01)

(52) U.S. Cl.
CPC ........ *G06F 1/266* (2013.01); *G06F 1/26* (2013.01); *G06F 1/3275* (2013.01); *Y02B 60/1228* (2013.01)

(58) Field of Classification Search
CPC ......... G06F 1/26; G06F 1/266; G06F 1/3275; G06F 13/1642; G06F 13/18; Y02B 60/1228
See application file for complete search history.

(56) References Cited

U.S. PATENT DOCUMENTS

| | | | | |
|---|---|---|---|---|
| 6,442,631 | B1 * | 8/2002 | Neufeld et al. | 710/107 |
| 2005/0005055 | A1 * | 1/2005 | Pasotti et al. | 711/1 |
| 2009/0276565 | A1 * | 11/2009 | Fujibayashi et al. | 711/112 |
| 2011/0258354 | A1 * | 10/2011 | Wang | 710/114 |
| 2013/0013943 | A1 * | 1/2013 | Belluomini et al. | 713/320 |
| 2013/0097433 | A1 * | 4/2013 | Boorman et al. | 713/300 |

\* cited by examiner

*Primary Examiner* — Dennis M Butler
(74) *Attorney, Agent, or Firm* — McDermott Will & Emery LLP (57) ABSTRACT

Aspects of the subject disclosure relate to a storage device including a flash memory, a controller coupled to the flash memory, wherein the controller is configured to store data to the flash memory and a power arbiter unit coupled to the controller and to the flash memory via a plurality of flash channels, wherein the power arbiter unit is configured to receive a plurality of power requests via one or more of the plurality of flash channels and process the plurality of power requests based on a respective priority identifier associated with each of the plurality of power requests. Additionally, a computer-implemented method and power arbiter unit (PAB) are provided.

15 Claims, 7 Drawing Sheets

POWER ARBITRATION FOR STORAGE DEVICES

This application claims the benefit of U.S. Provisional Application No. 61/613,916, filed Mar. 21, 2012, entitled "POWER ARBITRATION," which is incorporated herein by reference.

BACKGROUND

The subject technology relates generally to the management of power delivery to memory devices and particularly the management of power delivery to channels of a flash storage device.

Solid state storage devices, such as solid state drives (SSDs), are increasingly popular solutions for both consumer and enterprise data storage needs. As with other types of electronic devices, SSD operations are limited by finite power availability. In conventional SSDs, the amount of power necessary to perform a particular operation may vary by operation type. For example, the power allocation needed to perform a read operation may be different than that needed to perform an erase operation.

Some conventional power arbitration methods utilize a counter for each job/task that is run, in order to prioritize power requests for the purpose of allotting power to fulfill the power requests. Depending on the number of jobs, a potentially large number of counters must be used (and tracked), in order to determine relative job priority.

SUMMARY

In certain aspects, the subject technology relates to a storage device including a controller coupled to the flash memory, wherein the controller is configured to store data to the flash memory and a power arbiter unit coupled to the controller and to the flash memory via a plurality of flash channels. In certain aspects, the power arbiter unit is configured to receive a plurality of power requests via one or more of the plurality of flash channels and process the plurality of power requests based on a respective priority identifier associated with each of the plurality of power requests.

In another aspect, the subject technology relates to a computer-implemented method, including receiving, at a power arbiter unit, a plurality of power requests from a flash memory via one or more of the plurality of flash channels and processing one or more of the plurality of power requests based on a priority identifier associated with the one or more of the plurality of power requests.

In another aspect, the subject technology relates to a power arbiter unit configured to perform operations, including receiving a plurality of power requests via one or more of the plurality of flash channels and processing one or more of the plurality of power requests based on a priority identifier associated with the one or more of the plurality of power requests.

In yet another aspect, the subject technology relates to a computer-readable storage medium comprising instructions stored therein, which when executed by a processor, cause the processor to perform operations including, receiving, at a power arbiter unit, a plurality of power requests from a flash memory via one or more of the plurality of flash channels and processing one or more of the plurality of power requests based on a priority identifier associated with the one or more of the plurality of power requests.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without some of these specific details. In some instances, structures and components are shown in block diagram form in order to avoid obscuring the concepts of the subject technology.

Traditional power arbitration methods, such as those that require a counter and/or timer to track each task, can quickly become complex and computationally expensive as the number of tasks increases. The subject technology addresses these concerns by providing systems and methods for implementing a power arbitration process, wherein power requests originating from various flash memory channels are organized and served by a power arbiter unit (PAB), based on an associated priority designation.

Aspects of the subject disclosure provide a PAB configured to receive power requests from flash channels, and based on the power requests, deliver power to specific flash channel(s) so that a given operation (such as a read, write, erase or bus transfer operation), can be performed. In some implementations, a controller is configured to provide the PAB with a power budget that is used to indicate a maximum amount of power that is available to the PAB. By taking consideration of the power budget, the PAB can determine if a particular request can be served, for example, without exceeding the power budget.

As described in further detail below, each power request can include multiple attributes including, but not limited to, a priority identifier, a power weight identifier, and/or a request identifier. A priority identifier can be used to provide an indication as to the priority of a particular power request. Similarly, a power weight identifier can be used to provide an indication as to how much power is needed to service a particular power request, or an indication as to a duration of time (e.g., a number of clock cycles) for which power is to be delivered. The request identifier can be used to uniquely identify each power request received by the PAB.

In certain aspects, a PAB is coupled to a flash memory via multiple flash channels. Power requests are received via the flash channels and stored to the PAB. The PAB can include multiple memory units, such as a channel queue and a priority queue. In some aspects, the channel queue includes multiple channel FIFOs, for use in storing power requests received from various flash channels. Similarly, the priority queue can include multiple priority FIFOs for organizing and storing power requests based on priority. It is understood that the number of channel FIFOs in a channel queue, as well as the number of priority FIFOs in a priority queue, can vary with implementation.

As described in further detail below, power requests initially stored in the channel FIFOs are transferred into a priority FIFOs of the priority queue based on a priority identifier associated with the power request. Although, any number of priority levels can be used to differentiate between relative priority levels among the priority FIFOs (as well as among power requests), in certain aspects four different priority designations (e.g., levels 0-3) are used, wherein level 0 represents the highest priority designation, and level 3 represents the lowest priority designation.

Figure 1:
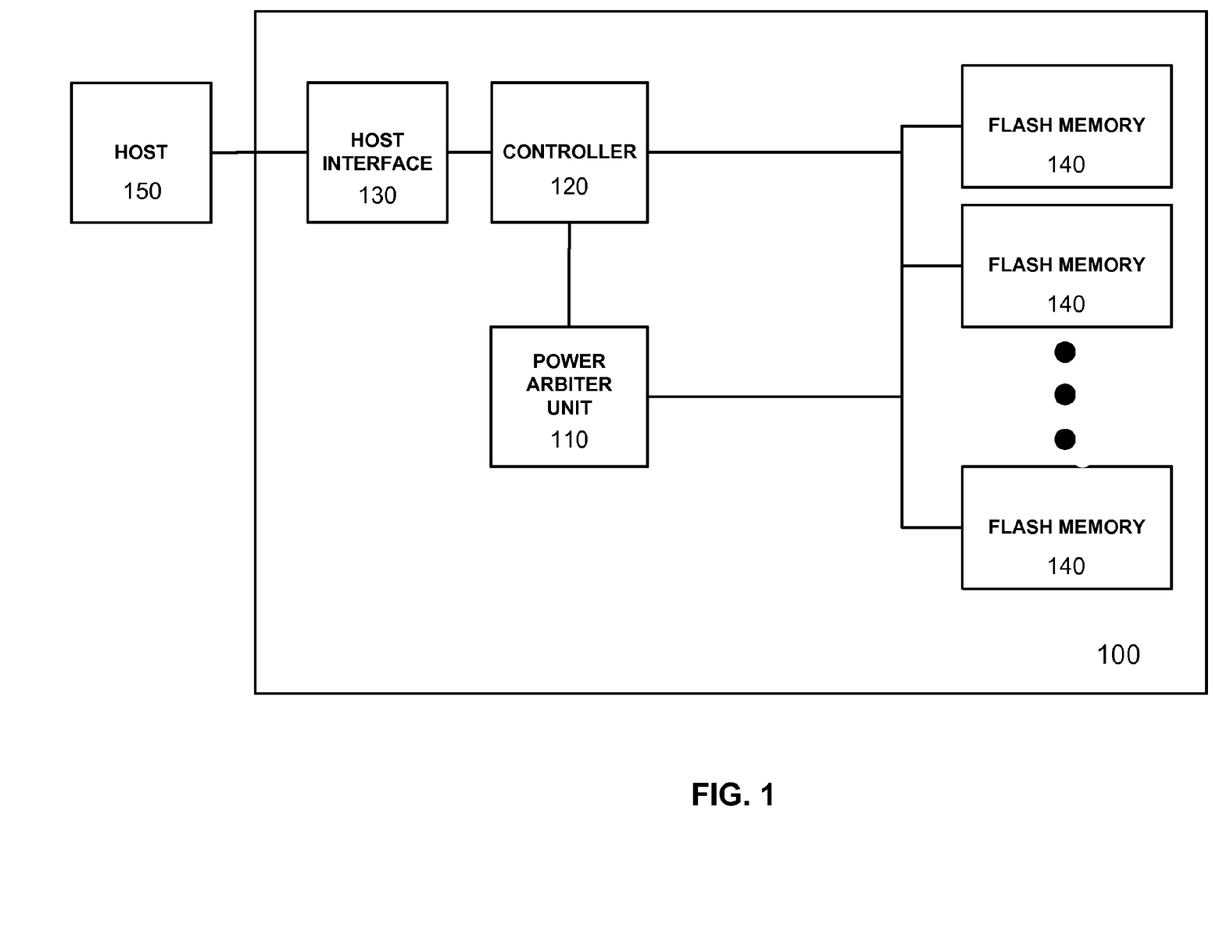
FIG. 1 illustrates an example of a storage device, including a power arbiter unit (PAB), according to some aspects of the subject technology.

FIG. 1 illustrates an example of a flash memory device 100 including power arbiter unit (PAB) 110, according to some aspects of the subject technology. Flash memory device 100 includes power arbiter unit 110, controller 120, host interface 130 and flash memories 140. Elements of flash memory device 100 can be integrated onto a single chip or implemented using two or more discrete components.

As illustrated in FIG. 1, controller 120 is coupled to flash memories 140, as well as PAB 110 and host interface 130. In turn, PAB 110 is coupled to flash memories 140 via bus 111, which can include multiple flash channels (not separately shown). Additionally, host 150 is coupled to flash memory device 100 via host interface 130.

Depending on implementation, a single flash channel can correspond with a single flash memory. In certain aspects, flash channels coupled to the PAB may be grouped into channel-slices. For example, two flash channels can be grouped together to form a single channel-slice, as described in greater detail with respect to FIG. 2. However, the instant disclosure is not limited by the number of flash channels allocated to a particular channel-slice. As such, depending on implementation, a greater (or fewer) number of flash channels may constitute a channel-slice.

Power requests received by PAB 110 can be stored in a channel queue of PAB 110 before being transferred to a priority queue. The sorting of power requests into priority queues can be based on a priority designations associated with the power requests, as determined by corresponding priority identifiers. After being stored to the priority queue, the power requests are then processed and served based on priority rankings associated with the respective priority FIFO in which the power requests are stored. Once a power request is processed and served, power is delivered to flash memories 140 based on the request.

Power delivery to the flash memory can be controlled based on a power budget allocated to PAB 110, e.g. by controller 120. By way of example, controller 120 can budget an amount of instantaneous power that is available to PAB 110 from which power requests can be served.

As explained in further detail below, before PAB 110 can serve a particular power request (e.g., by releasing power to a flash channel), it may first determine if serving the request will cause PAB 110 to exceed a maximum power threshold or budget. For example, PAB 110 can determine if the amount of power required by the current power request (when combined with the total amount of power for outstanding requests), exceeds a maximum power threshold. If serving a particular power request would necessitate exceeding an allotted power threshold, then the servicing of the request may be delayed.

Controller 120 can be implemented with a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions can be stored as firmware on ROM within the controller. One or more sequences of instructions can also be software stored and read from another storage medium, such as the flash memory array, or received from a host device e.g., via host interface 130. ROM, storage mediums, and flash memory arrays (e.g., flash memory array 140) represent examples of machine or computer readable media on which instructions/code executable by controller 120 can be stored. Machine or computer readable media can generally refer to any medium or media used to provide instructions to controller 120, including both volatile media, such as dynamic memory used for storage media or for buffers within controller 120, and non-volatile media, such as electronic media, optical media and magnetic media.

Host interface 130 can be configured to implement a standard interface, such as Serial-Attached SCSI (SAS), Fiber Channel interface, PCI Express (PCIe), SATA, USB, and the like. Host interface 130 can be configured to implement only one interface. Alternatively, host interface 130 may be configured to implement multiple interfaces that are individually selectable using a configuration parameter selected by a user or programmed at a time of assembly. Host interface 130 can include one or more buffers for buffering transmissions between a host device and controller 120. A host device can be any device configured to be coupled to data storage system 100 and to store data in data storage system 100. The host device may be a computing system such as a personal computer, a server, a workstation, a laptop computer, PDA, smart phone, and the like. Alternatively, the host device may be an electronic device such as a digital camera, a digital audio player, a digital video recorder, and the like.

Flash memory array 140 represents non-volatile memory devices for storing data. According to one aspect of the subject technology, flash memory array 140 includes NAND flash memory. Each component of flash memory array 140 can include a single flash memory device or chip, or may include multiple flash memory devices or chips arranged in multiple channels, as depicted in FIG. 1. Flash memory 140 is not limited to any particular capacity or configuration. For example, the number of physical blocks, the number of physical pages per physical block, the number of sectors per physical page, and the size of the sectors may vary within the scope of the subject technology.

Figure 2:
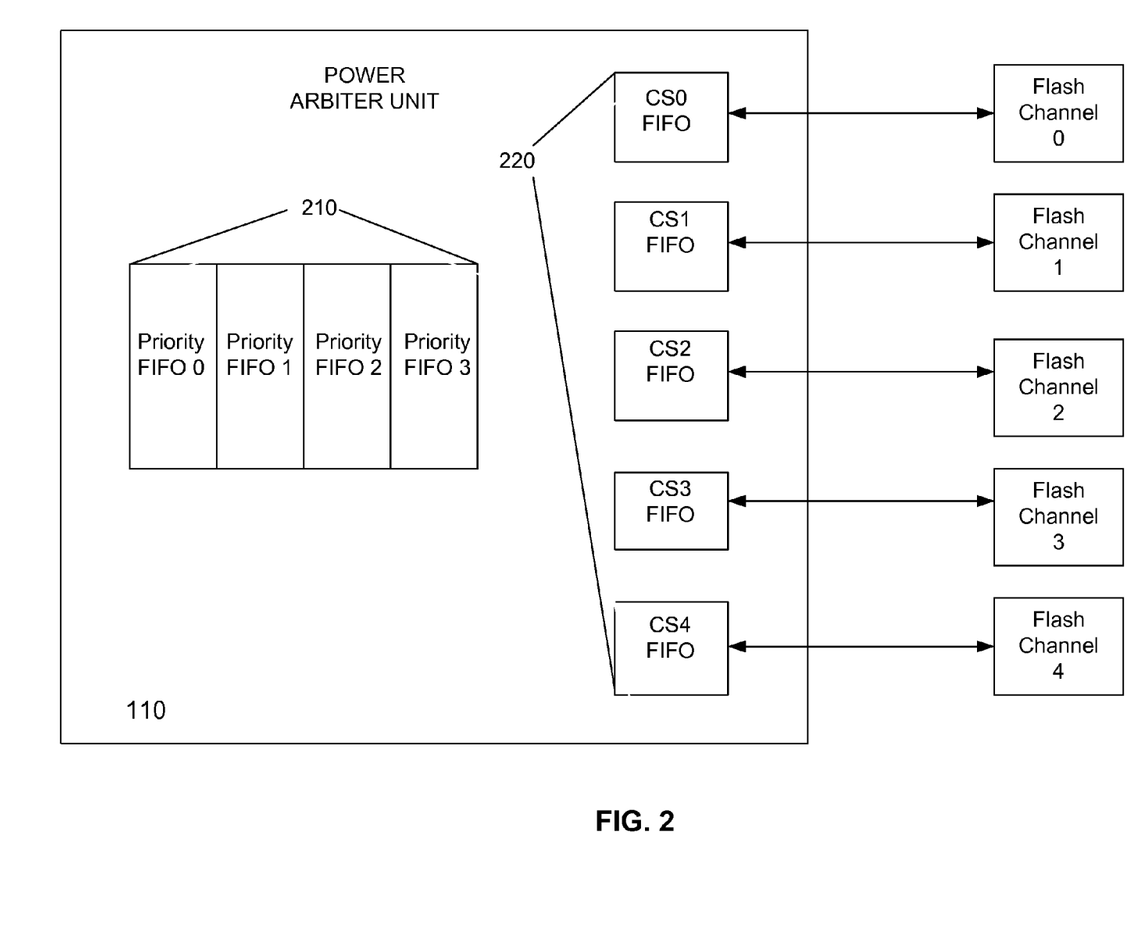
FIG. 2 illustrates a block diagram of an example PAB, according to some aspects of the technology.

FIG. 2 illustrates a block diagram of PAB 110, according to some aspects of the subject technology. PAB 110 contains priority queue 210, including multiple first-in-first-out (FIFO) memory portions, i.e., priority FIFOs, designated as priority FIFO 0, priority FIFO 1, priority FIFO 2 and priority FIFO 3. PAB 110 also includes channel queue 220, which is segmented into multiple FIFO portions, including CS FIFO 0, CS FIFO 1, CS FIFO 2, CS FIFO 3 and CS FIFO 4. Each channel FIFO of flash channel queue 220 is coupled to a respective flash channel, e.g., flash channel 0, flash channel 1, flash channel 2, flash channel 3, and flash channel 4.

Power requests received from the flash channels are initially stored in channel queue 220. In certain implementations, power requests received from each flash channel are stored in a respective channel FIFO. For example, power requests received from flash channel 0 are stored in CS FIFO 0. Although the flash channels in the example of FIG. 2 are shown to map directly to corresponding channel FIFOs, it is understood that other topologies may be implemented, without departing from the scope of the technology.

Power requests can be received from each flash channel, wherein each power request includes an indication of a priority level (e.g., a priority identifier), a power weight (e.g., a power weight identifier) and a request identification (e.g., a request identifier). The priority identifier can be used to identify an urgency or priority associated with the power request. The power weight identifier can be used to quantify an amount of power being requested and/or duration of time (e.g., number of clock cycles) for which power should be released. It is understood that the amount of power required for a particular power request can depend on the operation type to be performed (e.g., a read, write and/or data transfer operation, etc.). Additionally, it is understood that the priority of a particular power request (e.g., as identified by the associated priority identifier) can be different depending on the operation corresponding with the request.

By way of example, a power request associated with a read operation may be assigned a higher priority identifier than that for a power request associated with an erase operation. Furthermore, because less power may be required to execute a read operation, a power weight identifier associated with the read request may indicate a request for a smaller amount of power, as compared to that for the erase operation. Accordingly, power requests associated with read operations may take priority over those associated with erase operations. However, the amount of power required to serve power requests for erase operations may be greater.

Additionally, power requests corresponding with write operations may be associated with different priority identifiers and/or power weight identifiers from those corresponding with read and erase operations. For example, a power request for a write operation may have a priority designation that is lower than that of a read operation, and higher than that of an erase operation. In some implementations, the amount of power required to execute a write operation is less than for a read operation, but greater than that for an erase operation. As such, power requests associated with write operations may take a lower priority than read operations, but served before power requests for erase operations.

After power requests received from the flash channels have been stored in corresponding channel FIFOs, they are transferred to priority queue 210. By way of example, power requests stored in CS FIFO 0-CS FIFO 4, are first transferred from CS FIFO 0, then CS FIFO 1, etc., and stored in various priority FIFOs of priority queue 210. The sorting and storage of power requests into priority FIFOs (e.g., priority FIFOs 0-3) is performed based on a priority designation associated with the power requests, as indicated by a priority identifier. For example, power requests may generally be sorted into priority FIFOs that are associated with corresponding priority designations. By way of example, a power request of priority level 0 in CS FIFO 3 can be transferred to a priority FIFO of the same priority designation (e.g., priority level 0). Similarly, a power request of priority level 3, stored in CS FIFO 0, can be transferred to a priority FIFO having a priority designation of level 3, etc.

In some aspects, power requests of a given priority can be stored to priority FIFOs of a different priority designation. For example, if a priority FIFO matching the priority designation of a particular power request has reached capacity (e.g., can no longer accept additional power requests), the power request may be stored to a different priority FIFO, having of a different priority designation.

In some aspects, a priority designation for a priority FIFO may be either increased or decreased, for example, based on the number of power requests (or incoming requests) associated with a particular priority designation. By way of example, if a large number of incoming power requests are of priority designation level 2, then a greater proportion of clock cycles may be reallocated to a priority FIFO of priority level 2 (which will likely received the incoming power requests).

Depending on implementation, multiple control signals can be used in communication between PAB 110 and the flash channels. For example, when PAB 110 grants a power request it can activate a grant signal, including a grant identifier (e.g. grant_id) for one or more clock cycles. Each flash channel can also provide a release signal with an indication of an amount of power needed, for example, using a power weight identifier (e.g., power_weight) when it wants to initiate a release of a specified amount of power. In some examples, the power_weight signal can be split between the power request and release signal. In other aspects, the request and release can be exclusive, wherein only one is active during a given clock cycle.

In the example of FIG. 2, the PAB 110 has five masters, corresponding with five flash channels (e.g., flash channel 0, flash channel 1, flash channel 2, flash channel 3, and flash channel 4). Each flash channel can transmit a power request including a priority level, a power weight and power request identification. In the example of FIG. 2, each flash channel is coupled to a dedicated channel FIFO in the flash channel queue of the PAB. Thus, when a power request is sent by a particular flash channel, it is written into a respective channel FIFO.

The size of each channel FIFO can vary with implementation. In some instances, when a channel FIFO has been filled, the PAB can issue a FIFO full signal (e.g., fifo_full) to indicate (e.g., to the respective flash channel) that additional power requests cannot be accepted.

The arbiter algorithm implemented by the PAB can select a power request (stored in a channel FIFO) and write the power request to a priority FIFO based on the priority level of the power request (as designated by an associated priority identifier). The selection and transfer of power requests to the priority queue can be performed using a turn-by-turn approach. For example, in each clock-cycle, one of the channel FIFOs can be serviced and the power requests contained therein transferred to the priority queue. Once a turn is granted to a channel FIFO, a single power request can be transferred from the channel FIFO to a priority FIFO. However, in some implementations, multiple power requests can be transferred from the channel FIFOs on a given turn.

In some aspects, certain channel FIFOs can be serviced for a greater duration of time (e.g., a greater number of clock cycles), as compared with other channel FIFOs. Referring to the example of FIG. 2, if it is determined that a large number of power requests are received in CS FIFO 0, as compared with CS FIFO 3, PAB 110 may be configured to service CS FIFO 0 for a greater number of clock cycles, as compared to CS FIFO 3, in order to more efficiently process the incoming power requests.

It is understood that the servicing of power requests in the priority queue can occur in parallel with the transfer of priority requests from the channel queue to the priority queue. Additionally, power requests may be served in parallel with the receipt and storage of power requests from various flash channels.

Figure 3:
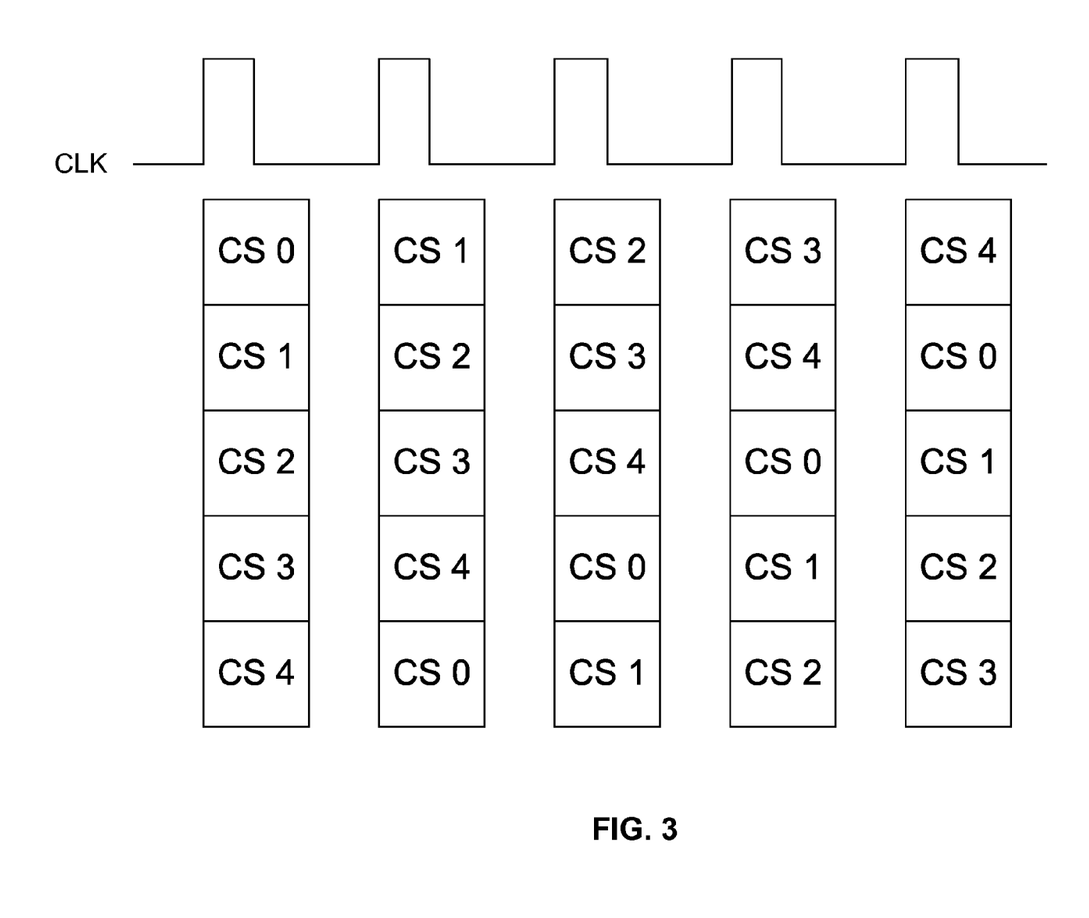
FIG. 3 illustrates an example of a timing diagram that can be used for writing power requests from channel FIFOs of a channel queue into priority FIFOs of a priority queue, according to some aspects of the technology.

FIG. 3 illustrates an example timing diagram for transferring power requests from channel FIFOs into priority queues of a PAB, according to some aspects of the technology. In FIG. 3, five channel FIFOs are shown (e.g., CS 0, CS 1, CS 2, CS 3 and CS 4). The clock signal (e.g., CLK) represents the timing for which power requests of a particular channel FIFO are transferred into the priority queue of the PAB. For example, the first clock cycle services CS 0, the second clock cycle services CS 1, and the third clock signal services CS 2 FIFO, etc.

As indicated by the layering of channel FIFO, the various channel FIFOs can be serviced sequentially. However, in other aspects, the channel FIFOs may be serviced in a different order than that illustrated in the example of FIG. 3.

In some implementations, if a target priority FIFO is full and unable to accept a new power request from the flash channel queue, the transfer of the power request can be delayed until space is available. For example, if each of priority FIFOs 0-3 are filled to capacity, a next-in-line power request in CS 0 can be temporarily ignored (e.g., not transferred into a priority queue) until one or more pending power requests in one of priority FIFOs 0-3 have been served. As such, the transfer of power requests in the flash channel queue can be delayed, but not deleted or rejected.

In some aspects, power requests stored to the priority queue can be more effectively processed/served by assigning a priority designation for the channel FIFOs, wherein channel FIFOs of a higher designation are served more frequently and/or for greater periods of time (e.g., for greater numbers of clock cycles). For example, if it is known that a large number of power requests are stored in CS 0, but relatively few requests are stored in CS 1-CS 4, then a greater number of clock cycles can be dedicated to CS 0, in order to more efficiently transfer the requests contained therein.

In certain aspects, if one or more priority FIFOs of a particular priority level are at capacity, additional power requests corresponding with that priority level are transferred into a priority FIFO of a different priority designation. For example, if priority FIFO 0, priority FIFO 1 and priority FIFO 2 are full, a pending power request in the channel queue, for example of priority level 0, can be transferred into priority FIFO 3. As such, power requests can be transferred into a priority FIFO with a priority designation that does not match that of the power request, depending on the fill level of the priority queue.

Once power requests have been transferred from the flash channel queue into the priority queue they can be processed and served. In certain implementations, power requests stored in the priority queue are served based on a priority ranking associated with the priority FIFO storing the power request. Although a priority queue of the subject technology can have different numbers of priority FIFOs, in some aspects a priority queue can contain four priority FIFOs (e.g., priority FIFO 0-priority FIFO 3), as illustrated in FIG. 2. In this example, priority FIFO 0 has the greatest relative priority, whereas priority FIFO 3 is associated with the lowest priority.

In certain aspects, a particular priority FIFO is selected in order to process one or more power requests stored therein, wherein the selection is made based on a priority level associated with the particular priority FIFO. Furthermore, the priority FIFOs may be served for a given number of clock cycles based on the priority level associated with priority FIFOs. For example, a greater number of clock cycles can be allotted to processing power requests of priority FIFOs of a higher priority level, as compared to those of a lower priority level.

By way of example, the selection of priority FIFOs for the processing of power requests may be performed sequentially. However, after a particular priority FIFO has been selected, the number of clock cycles dedicated to processing power requests contained therein can vary according to the associated priority designation.

Figure 4:
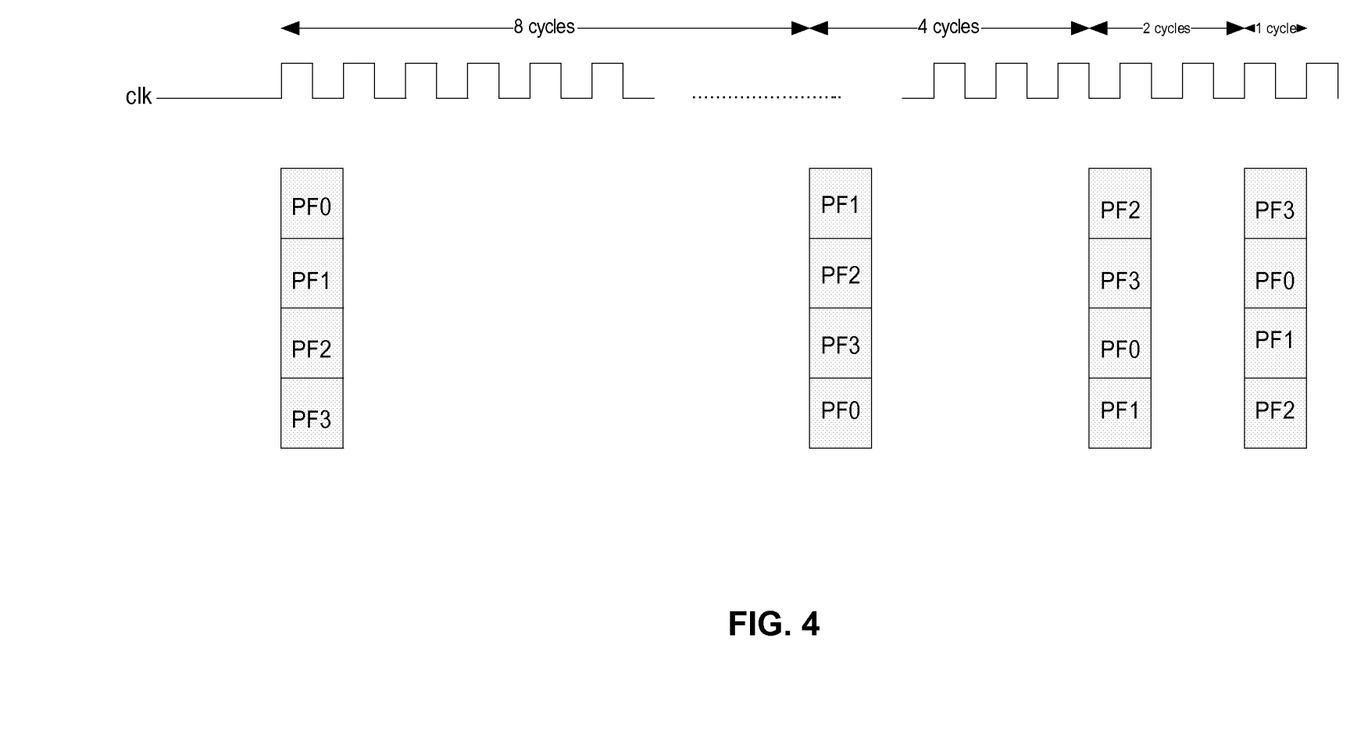
FIG. 4 illustrates an example of a timing diagram for serving power requests stored in priority FIFOs of different priority levels, according to some aspects of the technology.

It is understood that the number of clock cycles used to serve a priority FIFO of a given priority level can vary, depending on implementation. FIG. 4 illustrates an example of a timing diagram for serving power requests stored in priority FIFOs of different priority levels, according to some aspects of the technology. Specifically, in the example of FIG. 4, four priority FIFOs (e.g., PF0, PF1, PF2 and PF3) are served based on the timing shown with respect to the clock (e.g., clk) timing diagram.

As illustrated, PF0 is served for 8 consecutive clock cycles, whereas PF1, PF2 and PF3 are served for 4 clock cycles, 2 clock cycles and 1 cycle, respectively. As such, all power requests (of all priorities) are eventually served, however the power requests of PF0 are served twice as often as that of PF1. Similarly, the power requests of PF2 are served twice as often as those of PF3.

In certain aspects, power requests may be transferred between priority FIFOs (e.g., of different priority levels) within the priority queue. That is, power requests are moved (either into or out of) a priority FIFO of a higher/lower priority level. For example, if all the pending power requests are stored in priority FIFO 2 (e.g., having a priority designation of level 2), some of the power requests can be moved into priority FIFO 0, in order to better utilize available clock cycles. Additionally, in some implementations, an allocation of clock cycles used to service the priory queues may be shifted. For example, if a greater number of power requests are stored in a priority FIFO associated with a level 2 priority (as opposed to other priority FIFOs), clock cycles allocated to serve a priority FIFO of level 0 priority may be shifted to provide greater throughput with respect to the level 2 priority FIFO.

Additionally, according to some aspects, the number of clock cycles dedicated to a particular priority FIFO may change based on the fill level for that particular priority FIFO. For example, if a large number of priority level 3 power requests are received, and stored to a corresponding priority FIFO (e.g., PF3), the number of clock cycles used to service PF3 may be increased, for example, from 2 clock cycles per turn to 3 clock cycles per turn.

As discussed above, the servicing of power requests in the priority FIFOs can be based on a priority designation associated with the priority FIFOs. In certain implementations, one or more registers can be used to indicate a time (e.g., a number of clock cycles) for which a corresponding priority FIFO should be serviced. By way of example, four registers can be used to indicate the time of serving the priority FIFOs. In some aspects, the default value of the registers is zero, giving priority to the highest priority FIFO 0. For example, in the default mode, if there are any power requests in priority FIFO 0, the power requests can be served while other priority FIFOs are temporarily ignored.

The determination of whether or not to grant a specific power request can be based on a determination as to whether the request exceeds a total power budget allotted to the PAB. As noted above, a total power budget for a PAB can be determined by the controller and indicated via signaling provided to the PAB by the controller. Calculations to determine an amount of instantaneous power that can be provided by the PAB can vary depending in implementation. In some aspects, the determination as to whether a power request is granted depends on the total power budget, an amount of power that is requested, as well as an instantaneous amount of power that has been granted, e.g., to one or more recently granted requests.

One or more signals can be used to indicate an instantaneous amount of power that has been granted. For example, a granted_power register can be used to indicate a value of instantaneous power that is outstanding, which can increase when a new power request is granted, and reduced when a release signal is received from one or more of the channels. Additionally a max_power register can be used to indicate a maximum amount of power that may be granted per clock cycle. These values can be used to determine whether a power amount associated with a current power request will exceed the total power budget of the PAB.

Figure 5A:
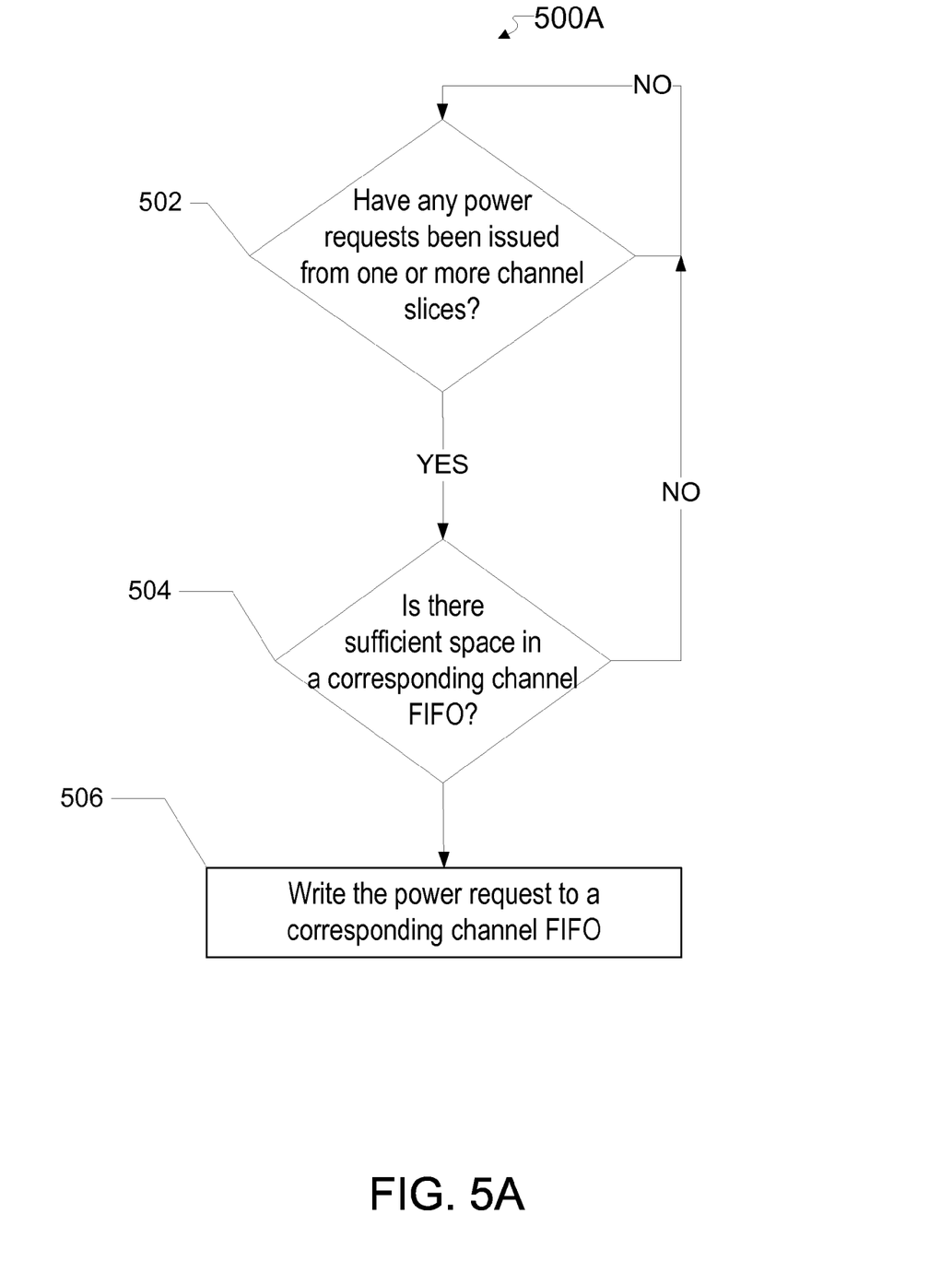
FIG. 5A illustrate steps of an example process for receiving power requests from flash channels, according to some aspects of the technology.

FIG. 5A illustrates steps of an example process 500A for implementing a power arbiter algorithm using a PAB, according to some aspects of the subject technology. Process 500A begins with step 502 in which it is determined if any power requests have been issued from one or more flash channels. As discussed above, each flash channel can correspond with one or more storage devices or flash chips. If in step 502 it is determined that no power requests have been issued, process 500A does not proceed, but instead repeats step 502 until it is determined that a power request has issued. Once it has been determined that one or more power requests have been issued, process 500 proceeds to step 504, in which it is determined if a corresponding channel FIFO has sufficient space with which to store the power request.

In some implementations, power requests received from the flash channels are stored to a corresponding channel FIFO in a channel queue of a PAB (e.g., channel queue 220 of PAB 110). It is understood that each channel FIFO in the channel queue can be associated with a dedicated flash channel, or multiple flash channels forming a channel-slice. Depending on implementation, different numbers of flash channels can form a channel slice that is associated with a particular channel FIFO.

If in step 504 it is determined that there is insufficient space, process 500A reverts to step 502 and the power request remains pending in the flash channel. Once space becomes available in the corresponding channel FIFO, the pending power request may be stored. Thus, power requests can be delayed, depending on the fill level of a corresponding channel FIFO, however, the power-requests are not ignored or discarded.

Alternatively, if in step 504 it is determined that there is sufficient space in a corresponding channel FIFO, process 500A proceeds to step 506, wherein a power request is written to a corresponding channel FIFO. As discussed above, the power request can contain various types of information. For example, the power request can include a priority identifier representing a priority or urgency associated with the power request. Similarly, the power request can include a power weight identifier that indicates an amount of power being requested, as well as a request identifier that can uniquely identify the power request and/or the channel from which the request originated.

Figure 5B:
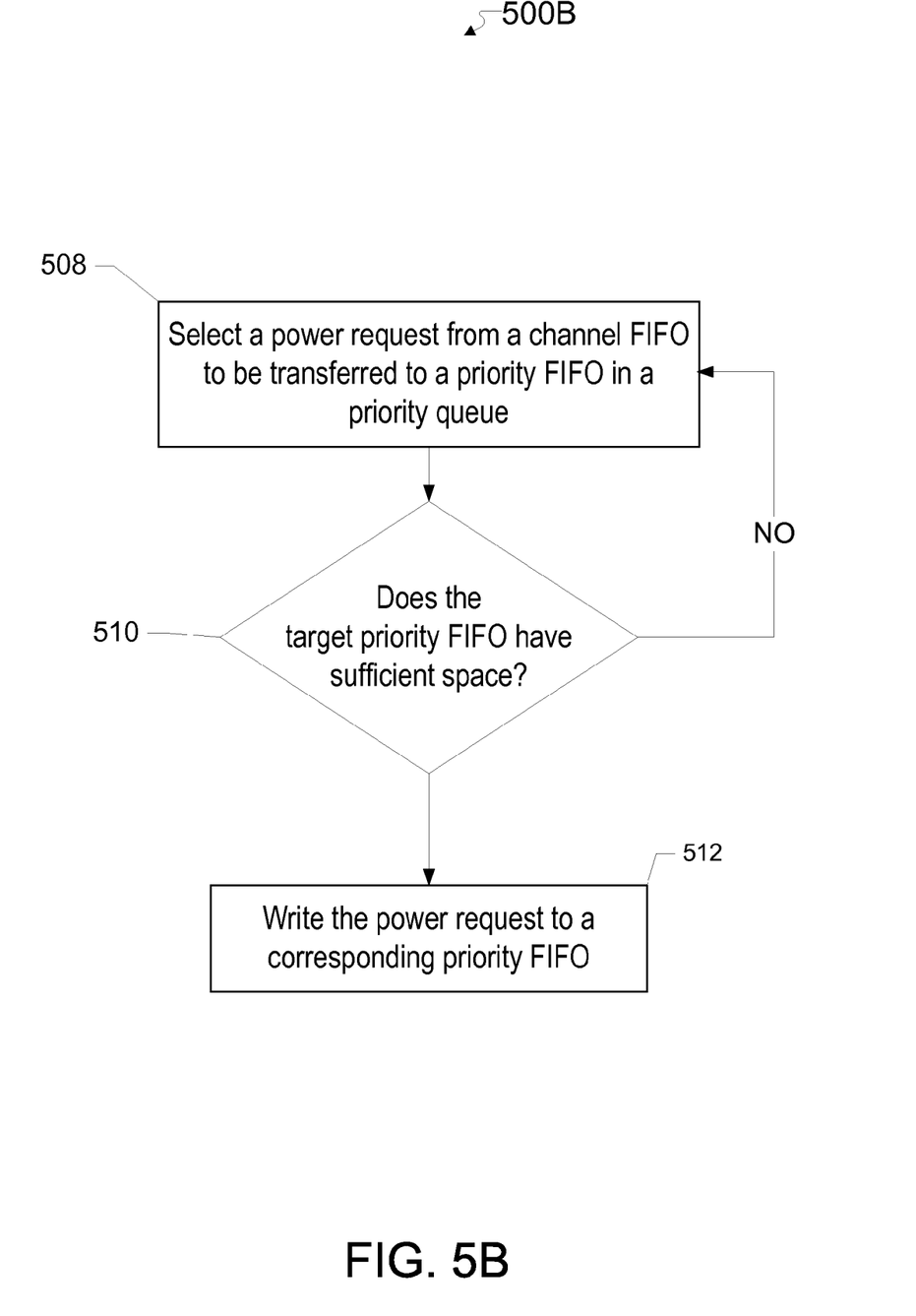
FIG. 5B illustrates steps of an example process for transferring power requests from a channel queue to a priority queue, according to some aspects of the technology.

FIG. 5B illustrates steps of an example process 500B for transferring power requests from a channel queue to a priority queue, according to some aspects of the technology. Process 500B begins with step 508, in which a power request is selected from a channel FIFO for transfer to a priority queue. As discussed above, a PAB of the subject technology can include multiple channel FIFOs, each of which can store one or more power requests. In certain aspects, the selection of various channel FIFOs can occur on a turn-by-turn basis as illustrated with respect to FIG. 3. However, depending on implementation, an equal, or different number of clock cycles may be dedicated to a particular channel FIFO, for use in transferring power requests contained therein.

By way of example, the selected power request may be associated with a priority level of 1 as identified by the corresponding priority identifier. As such, in step 510 it is determined whether a priority FIFO of similar priority designation (e.g., of priority level 1) has sufficient space to store the selected power request. If the corresponding priority FIFO does not have sufficient space, process 500B reverts back to step 508. Alternatively, if the corresponding priority FIFO contains sufficient space, process 500B proceeds to step 512, wherein the selected power request is written to the corresponding priority FIFO.

In some implementations, the power request is written into a priority FIFO of a corresponding priority designation. For example, a power request associated with a relatively high priority designation (e.g., having a priority level of 1), is likely written into a priority FIFO of a similar priority designation (e.g., having a priority designation of 1). However, depending on the fill level of the various priority FIFOs in the priority queue, the power request may be written to a priority FIFO of a different priority designation.

By way of example, if priority FIFOs 1-3 have reached their maximum fill level and cannot accept further power requests, a low priority power request in a channel FIFO (e.g., having a priority designation of 4) can be written into a priority FIFO of a high priority designation (e.g., having a priority designation of 0) in order to better utilize clock cycles.

Figure 5C:
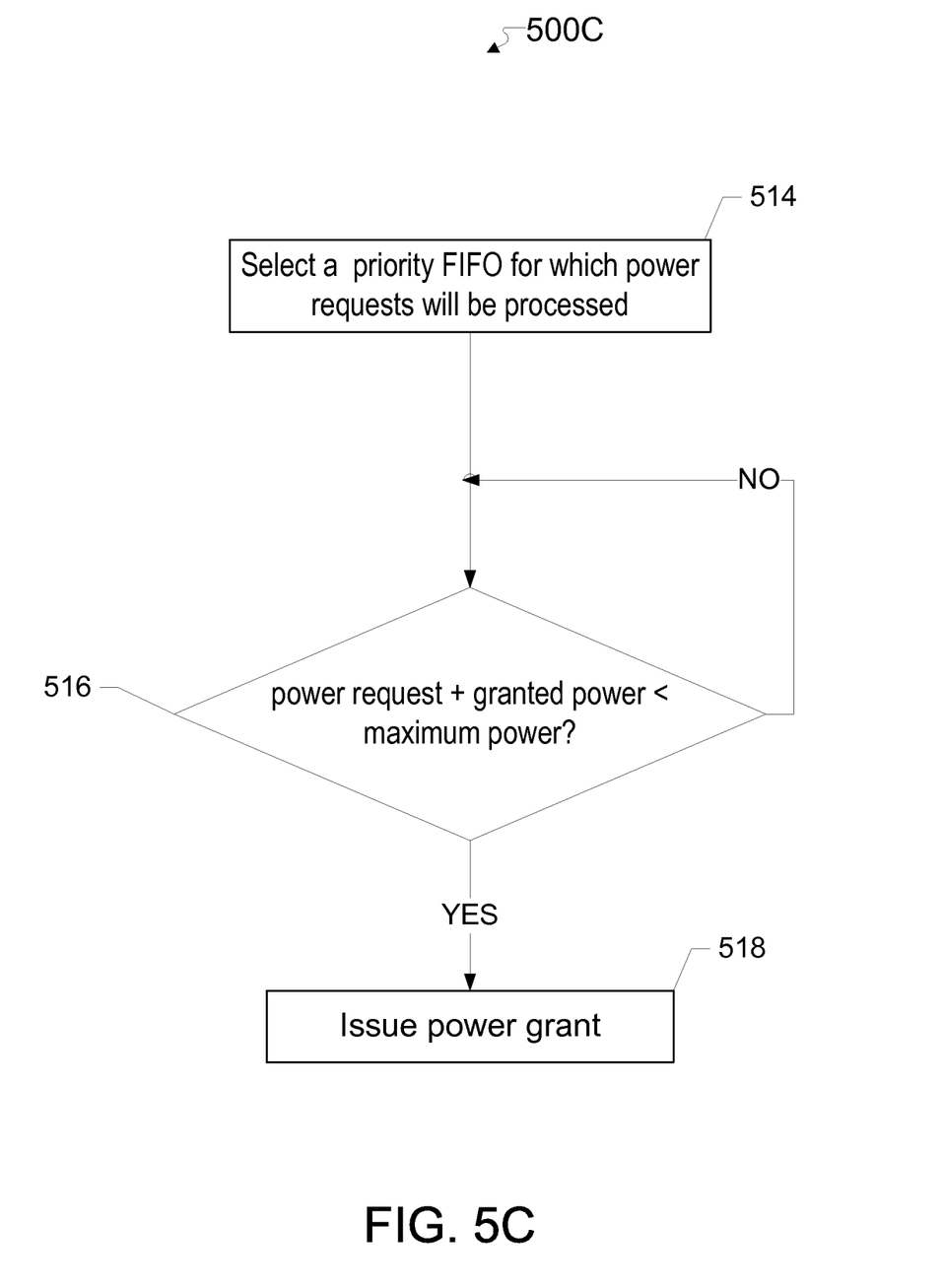
FIG. 5C illustrates steps of an example process for serving power requests in a priority queue, according to some aspects of the technology.

FIG. 5C illustrates steps of an example process 500C for serving power requests in a priority queue, according to some aspects of the technology. Process 500C begins with step 514, in which a priority FIFO is selected and one or more power requests stored in the selected priority FIFO are processed.

Priority FIFO selection can occur on a turn-by-turn basis as illustrated with respect to FIG. 4. However, the number of clock cycles, and thus the number of associated power requests that are serviced, can be based on a relative priority corresponding with the selected priority FIFO. As illustrated with respect to the example of FIG. 4, a higher priority designation can correspond with a greater number of clock cycles. For example, a priority FIFO of priority level 0 may be serviced for 8 clock cycles, whereas a priority FIFO of priority level 1 is serviced for 4 clock cycles. Similarly, a priority FIFO of priority level 2 may be serviced for 2 clock cycles, whereas a priority FIFO of priority level 3 is serviced for 1 only clock cycle. Thus, more power requests are processed from priority FIFOs of higher priority designations.

After a power request has been selected, process 500C proceeds to step 516, wherein it is determined if the selected power request can be granted. As discussed above, each power request can include information identifying an amount of power that is being requested (e.g., a power weight identification). The determination of whether to grant a particular request can be based on a comparison of the sum of the size of the current request, as well all currently granted requests, with a measure of the maximum available power.

A total power allotment provided to the PAB can be determined by the controller. If an amount of outstanding issued power (e.g., for one or more previous power requests), when combined with current power request exceeds the total amount of allotted power, the current power request may not be granted, in which case process 500C will revert to step 516. Alternatively, if the outstanding power grant, plus the amount of the current power request is less than the total power allotted to the PAB, then process 500C can proceed to step 518, wherein the power grant is issued.

The various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A storage device, comprising:
   a flash memory;
   a controller coupled to the flash memory, wherein the controller is configured to store data to the flash memory; and
   a power arbiter unit coupled to the controller and to the flash memory via a plurality of flash channels, wherein the power arbiter unit is configured to
      receive a plurality of power requests via one or more of the plurality of flash channels,
      receive a power budget from the controller, and
      process the plurality of power requests based on the power budget and a respective priority identifier associated with each of the plurality of power requests.

2. The storage device of claim 1, wherein the power arbiter unit is further configured to perform operations for:
   providing power to the flash memory via one or more of the plurality of flash channels based on a power weight identifier associated with the one or more of the plurality of power requests.

3. The storage device of claim 1, wherein the power arbiter unit further comprises:
   a channel queue comprising a plurality of channel FIFOs; and
   a priority queue comprising a plurality of priority FIFOs,
   wherein the power arbiter unit is further configured to perform operations for:
      storing the plurality of power requests in one or more of the channel FIFOs; and
      transferring one or more of the plurality of power requests from the one or more of the channel FIFOs to one or more of the priority FIFOs based on the priority identifier associated with the one or more of the plurality of power requests.

4. The storage device of claim 3, wherein the power arbiter unit is further configured to perform operations comprising:
   processing the one or more of the plurality of power requests based on a priority designation associated with the one or more of the priority FIFOs.

5. The storage device of claim 3, wherein the power arbiter unit is further configured to perform operations for:
   transferring at least one of the plurality of power requests from a first priority FIFO to a second priority FIFO from among priority FIFOs.

6. A computer-implemented method, comprising:
   receiving, at a power arbiter unit, a plurality of power requests from a flash memory via one or more of a plurality of flash channels;
   receiving a power budget from a controller; and
   processing one or more of the plurality of power requests based on the power budget and a priority identifier associated with the one or more of the plurality of power requests.

7. The computer-implemented method of claim 6, wherein processing the one or more of the plurality of power requests further comprises:
   providing power to the flash memory via the one or more of the plurality of flash channels based on a power weight identifier associated with the one or more of the plurality of power requests.

8. The computer-implemented method of claim 6, further comprising:
   storing the plurality of power requests in one or more of channel FIFOs; and
   transferring the one or more of the plurality of power requests from one or more channel FIFOs, from among a plurality of channel FIFOs, to one or more priority FIFOs, from among a plurality of priority FIFOs, based on the priority identifier associated with the one or more of the plurality of power requests.

9. The computer-implemented method of claim 8, wherein processing the one or more of the plurality of power requests is performed based on a priority designation associated with the one or more of the priority FIFOs.

10. The computer-implemented method of claim 8, further comprising:
    transferring at least one of the plurality of power requests from a first priority FIFO from among the plurality of priority FIFOs to a second priority FIFO from among the plurality of priority FIFOs.

11. A non-transitory computer-readable storage medium comprising instructions stored therein, which when executed by a processor, cause the processor to perform operations comprising:
    receiving, at a power arbiter unit, a plurality of power requests from a flash memory via one or more of a plurality of flash channels;
    receiving a power budget from a controller; and
    processing one or more of the plurality of power requests based on the power budget and a priority identifier associated with the one or more of the plurality of power requests.

12. The non-transitory computer-readable storage medium of claim 11, wherein processing the one or more of the plurality of power requests further comprises:
    providing power to the flash memory via one or more of the plurality of flash channels based on a power weight identifier associated with the one or more of the plurality of power requests.

13. The non-transitory computer-readable storage medium of claim 11, wherein the instructions, when executed by the processor, further cause the processor to perform operations comprising:
    storing the plurality of power requests in one or more of channel FIFOs; and
    transferring the one or more of the plurality of power requests from one or more channel FIFOs, from among a plurality of channel FIFOs, to one or more priority FIFOs, from among a plurality of priority FIFOs, based on the priority identifier associated with the one or more of the plurality of power requests.

14. The non-transitory computer-readable storage medium of claim 13, wherein processing the one or more of the plurality of power requests is performed based on a priority designation associated with the one or more of the priority FIFOs.

15. The non-transitory computer-readable storage medium of claim 13, further comprising:
    transferring at least one of the plurality of power requests from a first priority FIFO from among the plurality of priority FIFOs to a second priority FIFO from among the plurality of priority FIFOs.

* * * * *